(12) United States Patent
Bouda

(10) Patent No.: US 9,628,879 B2
(45) Date of Patent: Apr. 18, 2017

(54) HIERARCHICAL GUIDED SEARCH FOR N-TUPLE DISJOINT OPTICAL PATHS

(71) Applicant: Fujitsu Limited, Kawasaki-shi, Kanagawa (JP)

(72) Inventor: Martin Bouda, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 61 days.

(21) Appl. No.: 14/595,979

(22) Filed: Jan. 13, 2015

(65) Prior Publication Data
US 2015/0296279 A1    Oct. 15, 2015

Related U.S. Application Data

(60) Provisional application No. 61/978,016, filed on Apr. 10, 2014, provisional application No. 61/977,999, filed on Apr. 10, 2014.

(51) Int. Cl.
*H04Q 11/00* (2006.01)
*H04L 12/24* (2006.01)
*H04B 10/27* (2013.01)
*G06F 17/10* (2006.01)

(52) U.S. Cl.
CPC ......... *H04Q 11/0062* (2013.01); *G06F 17/10* (2013.01); *H04B 10/27* (2013.01); *H04L 41/142* (2013.01); *H04Q 2011/0073* (2013.01)

(58) Field of Classification Search
CPC ....... H04Q 11/0062; H04Q 2011/0073; H04Q 2011/0086; H04Q 2011/0098; H04L 41/142; H04B 10/27
See application file for complete search history.

(56) References Cited

U.S. PATENT DOCUMENTS

| 7,372,803 | B2 | 5/2008 | de Boer et al. |
| 8,830,071 | B2 | 9/2014 | Borth et al. |
| 2006/0215544 | A1 | 9/2006 | Asa et al. |
| 2008/0154862 | A1* | 6/2008 | Henriot ............ G06F 17/30935 |
| 2010/0104281 | A1* | 4/2010 | Dhillon ............... H04J 14/0227 398/45 |
| 2010/0329120 | A1 | 12/2010 | Zhang et al. ................. 370/238 |
| 2012/0213520 | A1 | 8/2012 | Doverspike et al. ........... 398/79 |
| 2012/0308224 | A1 | 12/2012 | Li et al. |
| 2013/0236176 | A1 | 9/2013 | Doverspike et al. |
| 2014/0308040 | A1 | 10/2014 | Sekiya et al. ................... 398/79 |

OTHER PUBLICATIONS

J. Simmons, "Optical Network Design and Planning", Springer, 1st Edition, (Book), Jun. 2, 2008.
T. Cormen, "Introduction to Algorithms", p. 562-564, 2009.
(Continued)

*Primary Examiner* — David Payne
*Assistant Examiner* — Casey Kretzer
(74) *Attorney, Agent, or Firm* — Baker Botts L.L.P.

(57) ABSTRACT

A matrix M is used to determine groups of potential regenerator placements and obtain potential end-to-end optical paths by selecting desired sequences of regenerators. Then, a hierarchical guided search may be employed to efficiently select desired N-tuple disjoint optical paths from the potential optical paths. The hierarchical guided search may employ a search graph and a search tree to guide the search and to eliminate candidate nodes and optical paths early in the search process.

21 Claims, 8 Drawing Sheets

700 ⟶ HIERARCHICAL GUIDED SEARCH (HGS) GRAPH

(56) References Cited

OTHER PUBLICATIONS

Provencher, Operations Automation Using Netsmart 1500 Element Manager, Fujitsu Sci. Tech. J., vol. 45, No. 4, pp. 422-430, Mar. 26, 2009.
X. Wang et al., "Reachability Matrix-based Path Computation using Matrix-Self-Multiplication", Proc. ECOC, p. 5.16, London (2013), 2013.
P. Hart et al., "A formal basis for the heuristic determination of minimum cost paths", Teee Trans. No. Systems Science and Cybernetics, 4:100-107, 1968.
R. Bauer et al., "Combining Hierarchical and Goal-Directed Speed-Up Techniques for Dijkstra's Algorithm", Proc. WEA, Cape Cod, 2008.
U.S. Appl. No. 14/596,007; "Memory-Efficient Matrix-Based Optical Path Computation"; 47 pages, filed Jan. 13, 2015.
M. Bouda et al., "Reachability matrix and directed search-based optical path computation for large optical networks", ECOC 2014, p. 6.17, 3 pages, Sep. 2014.
U.S. Appl. No. 14/169,980; "Optical Path Computation Based on a Reachability Matrix"; 36 pages, filed Jan. 31, 2014.
Farrel et al., "A Path Computation Element (PCE)-Based Architecture," Network Working Group, The Internet Society (2006); 40 pages, Aug. 2006.
Jane M. Simmons, "Optical Network Design and Planning," Springer, 1st Edition; 6 pages, Jun. 2, 2008.
Non-Final Office Action, U.S. Appl. No. 14/169,980; 9 pages, Jul. 30, 2015.
Final Office Action, U.S. Appl. No. 14/169,980; 9 pages, Feb. 22, 2016.

\* cited by examiner

HIERARCHICAL GUIDED SEARCH FOR N-TUPLE DISJOINT OPTICAL PATHS

CROSS-REFERENCE TO RELATED APPLICATIONS

This application claims priority from U.S. Provisional Application No. 61/978,016 filed Apr. 10, 2014, entitled "MEMORY-EFFICIENT MATRIX-BASED OPTICAL PATH COMPUTATION". This application also claims priority from U.S. Provisional Application No. 61/977,999 filed Apr. 10, 2014, entitled "N-TUPLE DISJOINT OPTICAL PATH COMPUTATION".

BACKGROUND

Field of the Disclosure

The present disclosure relates generally to optical communication networks and, more particularly, to hierarchical guided search for N-tuple disjoint optical paths.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, couplers, etc. configured to perform various operations within the network.

The function of computation of an optical signal path through the various network elements is a core function for design, modeling, management, and control of optical networks. Optical path computation may enable operators of an optical network to customize, control and update network policies. One feature of optical path computation involves determination of end-end reachable optical paths from a source node to a destination node. When the source node and the destination node are determined to be 'directly reachable', then one or more paths exist in the optical network between the source node and the destination node that are all-optical paths.

Absent direct reachability from the source node to the destination node, an optical signal will be electrically regenerated using optical-electrical-optical (O-E-O) regenerators along a given signal path, which may involve greater network resources and may be less cost effective. When regenerators are used, an end-end reachable path may include a certain number of regenerators between the source node and the destination node. Thus, one challenging goal in optical path computation may be finding an end-end reachable path that includes a minimum or a specified number of regenerators, in addition to satisfying other path constraints, for example, such as a desired level of signal latency or cost. For example, U.S. patent application Ser. No. 14/169,980 filed on Jan. 31, 2014 discloses the use of reachability matrices and the property of transitive closure with respect to matrix operations to determine regenerator node locations. However, an amount of memory consumed during computation of a series of reachability matrices may represent a computational constraint for efficiency or computational feasibility.

SUMMARY

In one aspect, a disclosed method is for evaluation of optical paths in optical networks. Based on a matrix M including all-optical reachability information for nodes in an optical network, the method may include generating sets of all-optical paths between a source node and a destination node. The all-optical paths may include a minimum number of regenerators between the source node and the destination node. The sets of all-optical paths may be grouped according to regenerator stages. The method may further include generating path cost information for the sets of all-optical paths. The path cost information may include a cost metric for each of the all-optical paths. Based on the path cost information, the method may further include calculating node cost information for each node associated with the all-optical paths to the destination node, excluding the destination node. The method may also include generating a hierarchical guided search graph including the nodes associated with the sets of all-optical paths, optical path groups comprising optical paths between common nodes, the path cost information, and the node cost information. Based on the hierarchical guided search graph, the method may also include determining a lowest cost optical path between the source node and the destination node.

In any of the disclosed embodiments, determining the lowest cost optical path between the source node and the destination node may further include beginning with the source node in the hierarchical guided search graph, evaluating optical path groups from each node to each successive regenerator stage towards the destination node in the hierarchical guided search graph based on the path cost information and the node cost information, including selecting a next optical path to a next regenerator stage.

A further disclosed aspect may include a path computation engine for computation of optical paths in optical networks. The path computation engine may include instructions executable by a processor having access to memory media storing the instructions. Yet another disclosed aspect may include an optical network including the path computation engine, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
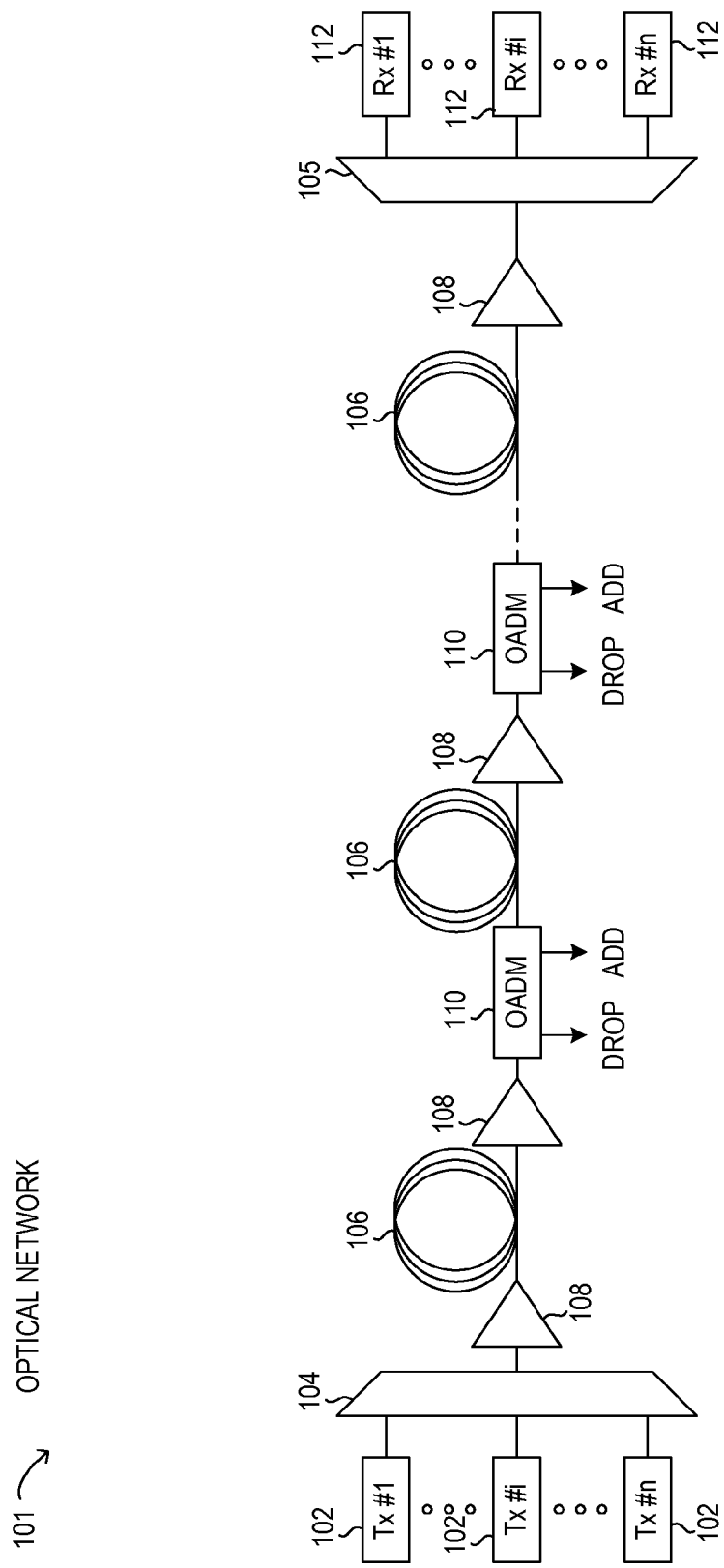
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective element. Thus, for example, device "72-1" (not used in the drawings) may refer to an instance of a device class, which may be referred to collectively as devices "72" and any one of which may be referred to generically as a device "72".

Turning now to the drawings, FIG. 1 illustrates an example embodiment of optical network 101. As shown, optical network 101 may depict a transport plane view including elements that carry user data and comprise network equipment. Accordingly, optical network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more amplifiers 108, one or more optical add/drop multiplexers (OADM) 110, and one or more receivers 112.

Optical network 101 may comprise a point-to-point optical network with terminal nodes, a ring optical network, a mesh optical network, or any other suitable optical network or combination of optical networks. Optical fibers 106 may comprise thin strands of glass capable of communicating the signals over long distances with very low loss. Optical fibers 106 may comprise any suitable type of fiber.

Optical network 101 may include devices configured to transmit optical signals over fibers 106. Information may be transmitted and received through network 101 by modulation of one or more wavelengths of light to encode the information on the wavelength. In optical networking, a wavelength of light may also be referred to as a channel. Each channel may be configured to carry a certain amount of information through optical network 101.

To increase the information carrying capabilities of optical network 101, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 101 may be configured to transmit disparate channels using WDM, DWDM, or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within optical network 101. Amplifiers 108 may be positioned before or after certain lengths of fiber 106. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, amplifiers 108 may comprise an erbium-doped fiber amplifier (EDFA). In various embodiments, other suitable amplifiers, such as a semiconductor optical amplifier (SOA), may be used.

OADMs 110 may be coupled to optical network 101 via fibers 106 also. OADMs 110 comprise an add/drop module, which may include any system, apparatus or device configured to add and drop optical signals from fibers 106. After passing through an OADM 110, a signal may travel along fibers 106 directly to a destination, or the signal may be passed through one or more additional OADMs 110 before reaching a destination. In certain embodiments of optical network 101, OADM 110 may represent a reconfigurable OADM (ROADM) that is capable of adding or dropping individual or multiple wavelengths of a WDM signal carrying data channels to be added or dropped in the optical domain, for example, using a wavelength selective switch (WSS).

Optical network 101 may also include one or more demultiplexers 105 at one or more destinations of optical network 101. Demultiplexer 105 may comprise any system apparatus or device that may act as a demultiplexer by splitting a single WDM signal into its individual channels. For example, optical network 101 may transmit and carry a forty channel DWDM signal. Demultiplexer 105 may divide the single, forty channel DWDM signal into forty separate signals according to the forty different channels.

Optical network 101 may also include receivers 112 coupled to demultiplexer 105. Each receiver 112 may be configured to receive signals transmitted in a particular wavelength or channel, and process the signals for the information that they contain. Accordingly, optical network 101 may include at least one receiver 112 for every channel of the network.

Optical networks, such as optical network 101, may further employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). In PSK, the information carried by the optical signal may be conveyed by modulating the phase of a reference signal, also known as a carrier wave, or simple, a carrier. The information may be conveyed by modulating the phase of the signal itself using differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

In an optical communications network, such as optical network 101, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted. Additionally optical network 101 may include additional elements not expressly shown, such as a dispersion compensation module. Also, as mentioned above, although depicted as a point-to-point network, optical network 101 may comprise any suitable network for transmitting optical signals such as a ring or mesh network.

In operation, optical network 101 may include various nodes and optical path connections between the nodes. As disclosed herein, memory-efficient matrix-based optical path computation may be performed for nodes in optical network 101.

Figure 2:
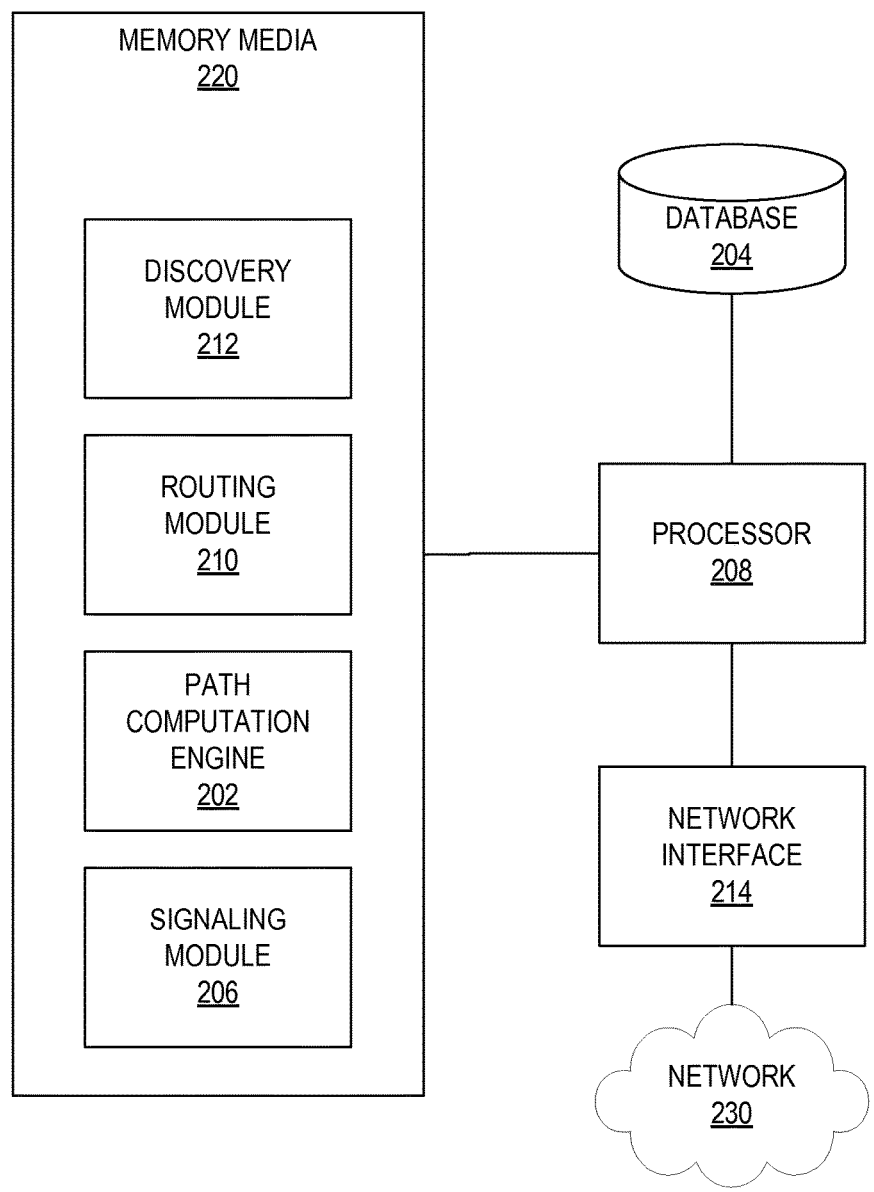
FIG. 2 is a block diagram of selected elements of an embodiment of a control system for an optical network.

Referring now to FIG. 2, a block diagram of selected elements of an embodiment of control system 200 for implementing control plane functionality in optical networks, such as, for example, in optical network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, control system 200 includes processor 208 and memory media 220, which may store executable instructions (i.e., executable code) that may be executable by processor 208, which has access to memory media 220. Processor 208 may execute instructions that cause control system 200 to perform the functions and operations described herein. For the purposes of this disclosure, memory media 220 may include non-transitory computer-readable media that stores data and instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210. As described herein, path computation engine 202, in conjunction with signaling module 206, discovery module 212, and routing module 210, may represent instructions or code for implementing various algorithms according to the present disclosure.

Also shown included with control system 200 in FIG. 2 is network interface 214, which may be a suitable system, apparatus, or device operable to serve as an interface between processor 208 and network 230. Network interface 214 may enable control system 200 to communicate over network 230 using a suitable transmission protocol or standard. In some embodiments, network interface 214 may be communicatively coupled via network 230 to a network storage resource. In some embodiments, network 230 may be an embodiment of at least certain portions of optical network 101. Network 230 may also include certain portions of a network using galvanic or electronic media. In certain embodiments, network 230 may include at least certain portions of a public network, such as the Internet. Network 230 may be implemented using hardware, software, or various combinations thereof.

In certain embodiments, control system 200 may be configured to interface with a person (i.e., a user) and receive data about the optical signal transmission path. For example, control system 200 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 200 may be configured to receive data about the optical signal transmission path from a device such as another computing device or a network element, for example via network 230.

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 2, routing module 210 may be responsible for propagating link connectivity information to various nodes within an optical network, such as optical network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as optical network 101. For example, when an ingress node in the optical network receives a service request, control system 100 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation of control system 200, a feature of optical path computation may include the calculation of end-to-end reachable paths. As noted previously, a directly reachable path may represent a path between a source node and a destination node in an optical network for which an optical signal between the source node and the destination node may be transmitted and received through purely optical components. Such a directly reachable path may stand in contrast, for example, to an indirectly reachable path between the source node and the destination node that involves electrically regenerating the optical signal using O-E-O regenerators, referred to herein as simply 'regenerators', before reaching the destination. An indirectly reachable path may include a plurality of regenerators. Thus, an end-to-end reachable path may include a path from a source node, to a first regenerator node, to at least one second regenerator node, and finally, to a destination node. Path computation engine 202 may be configured to find end-to-end reachable paths that integrate a minimum or an otherwise-specified number of regenerators, as well as satisfying other path constraints such as latency and cost.

Path computation engine 202 may further be configured to perform graph transformation to determine end-to-end reachable path computation. Graph transformation may include adding virtual links to a physical topology determined originally from physical components of the optical network. A virtual link may represent a link connecting two nodes, such that the two nodes are optically reachable without an intervening regenerator. After all virtual links connecting optically reachable node pairs have been added to the graph topology, the original topology may be transformed into a reachability graph, upon which least-hop routing may be performed to obtain end-to-end reachable paths requiring a minimum number of regenerators. To perform such functionality, a computationally-heavy path algorithm may be employed by path computation engine 202 to obtain the desired number and type of reachable paths. However, configuring path computation engine 202 to perform such graph transformation-based end-to-end reachable path computation may involve extensive use of graph theory and routing algorithms, which are complex and burdensome to manipulate.

Furthermore, path computation engine 202 may be configured to perform a reachability-matrix-based optical path computation that is based on matrix operations, rather than relying on graph transformation. Thus, path computation engine 202 may be configured to perform the optical path computation based on matrix operations using reachability matrices to represent corresponding reachability graphs, and may thus avoid complex graph transformation and routing algorithms. By employing the optical path computation based on reachability matrices, path computation engine 202 may be configured with reduced optical engineering complexity. Furthermore, path computation engine 202 may centralize optical path computation functionality for various parts of optical network 101. In addition, path computation engine 202 may provide an abstracted optical network view to control system 200 for enabling software-defined networks (SDN) in optical network 101. Although control system 200 and path computation engine 202 are depicted in FIG. 2 as singular elements, it will be understood that optical path computation performed by path computation engine 202 may be modularized and implemented and deployed in a scalable and parallel manner across multiple devices (not shown) to support path computation in optical networks of varying size or node complexity.

As disclosed in further detail herein, in operation, control system 200 may be used for memory-efficient matrix-based optical path computation. Specifically, path computation engine 202 may be used to perform optical path computation based on matrix operations using reachability matrices. Furthermore, path computation engine 202 may perform memory-efficient matrix-based optical path computation using a single matrix M that may hold all the information, or the equivalent information, as stored in a series of reachability matrices $RM\hat{\,}i$. In this manner, the memory-efficient matrix-based optical path computation disclosed herein may reduce an amount of computational resources (e.g., by path computation engine 202) per series of reachability matrices $RM\hat{\,}i$ for i=1 . . . R, where i is a minimum number of hops indicated by the respective reachability matrix $RM\hat{\,}i$, and R is an upper bound for i, such as a total number of nodes in a given network topology. The computational resources may include an amount of memory or a computational efficiency, which may be determinative for computational feasibility. In particular, for large networks having N-number of nodes, where N is relatively large, such as in the thousands of nodes, memory-efficient matrix-based optical path computation, as disclosed herein, may enable computation of a complete series of reachability matrices RM^i, or computation of any desired one of reachability matrices RM^i at a desired time, in a computationally tractable manner, making such optical path computations practical or economically feasible, particularly for real-time applications involving optical network provisioning.

Specifically, the element values of matrix M may be $m_{ij}$ representing values that indicate a number of all optical paths (i.e., hops) which may be concatenated to form an overall optical path from a desired source node to a desired destination node in optical network 101, for example. In particular embodiments, $m_{ij}$ may have a value of 1 plus a minimum number of regenerators connecting node i with node j when node i and node j are reachable using regenerators. When node i and node j are not reachable using any number of regenerators, $m_{ij}$ may have a value of zero (0). When i=j, $m_{ij}$ may be 0 or 1, in various embodiments, as explained below. In this manner, matrix M may be computed using so-called 'in-place' memory consumption, where previous values (or previous iterations) of M may be overwritten with current values (or current iterations) of M without loss of information. A first algorithm for calculating M that may be computationally efficient (at least $O(N^3)$) is described in further detail with respect to FIG. 3.

Figure 3:
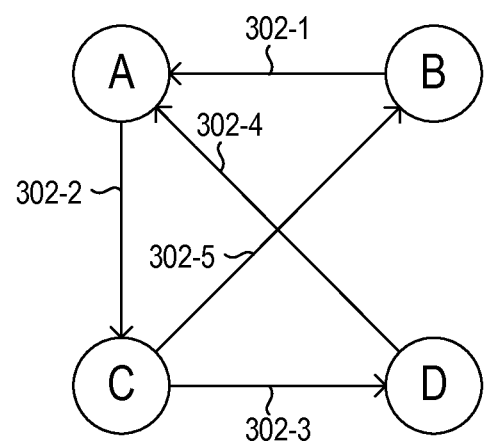
FIG. 3 is a block diagram of selected elements of an embodiment of a network topology.

Referring now to FIG. 3, a block diagram of selected elements of an embodiment of network topology 300 for illustrating an example embodiment of memory-efficient matrix-based optical path computation, as disclosed herein, is illustrated. As shown, network topology 300 includes nodes A, B, C and D, between which certain directional optical paths 302 are present. In network topology 300, optical path 302-1 enables optical communication from node B to node A. In network topology 300, optical path 302-2 enables optical communication from node A to node C. In network topology 300, optical path 302-3 enables optical communication from node C to node D. In network topology 300, optical path 302-4 enables optical communication from node D to node A. In network topology 300, optical path 302-5 enables optical communication from node C to node B. Accordingly, as disclosed in U.S. patent application Ser. No. 14/169,980, a reachability matrix (RM) for network topology 300 may be given in Table 1.

TABLE 1

All optical path reachability matrix (RM) for network topology 300

| NODES | A | B | C | D |
|---|---|---|---|---|
| A | 1 | 0 | 1 | 0 |
| B | 1 | 1 | 0 | 0 |
| C | 0 | 1 | 1 | 1 |
| D | 1 | 0 | 0 | 1 |

In Table 1, and in the following tables depicting matrices, rows represent source nodes, while columns represent destination nodes. Thus, each 1 value for different nodes in the reachability matrix of Table 1 indicates a directional optical path 302 in FIG. 3. As an arbitrary convention, identity values in the reachability matrix of Table 1 for connections to the same node are also 1, but may be 0 in other embodiments.

An example embodiment of a first algorithm for memory-efficient matrix-based optical path computation for network topology 300 to calculate matrix M will now be described in further detail. The first algorithm may be may be computationally efficient (at least $O(N^3)$) and may be based on a Floyd-Warshall algorithm for transitive closure. The first algorithm may begin with the reachability matrix of Table 1 for network topology 300. In the first algorithm, the reachability matrix of Table 1 may be modified to result in a starting version of matrix M, as given in Table 2.

TABLE 2

Starting version of matrix M based on the reachability matrix (RM) for network topology 300

| NODES | A | B | C | D |
|---|---|---|---|---|
| A | 0 | X | 1 | X |
| B | 1 | 0 | X | X |
| C | X | 1 | 0 | 1 |
| D | 1 | X | X | 0 |

In Table 2, the identity values from the reachability matrix of Table 1 for connections to the same node have been set to 0, which is an arbitrary convention for the identity values. Also in Table 2, 0 values from the reachability matrix of Table 1 have been given a value X. In some embodiments, the value X may be selected to be infinity ($\infty$) for computational purposes. In given embodiments, the value X may be selected to be greater than any other number for computational purposes. In certain embodiments, the value X may be selected to be a maximum extent of a variable for computational purposes. In particular embodiments, the value X may be selected to be greater than a number of nodes in a network topology for which the optical path computation is being performed, such as greater than 4 for network topology 300.

In the first algorithm, the matrix M will be finally calculated such that matrix elements in matrix M signify a minimum number of all-optical paths that may be concatenated in order to create an end-to-end all optical connection between the two nodes for each respective matrix element. Beginning with matrix M in Table 2, matrix M may be calculated in-place in successive steps or iterations, in order to minimize a memory consumption for calculating matrix M. In some embodiments, the successive steps may be repeated over n iterations. In some embodiments, the successive steps may be terminated after fewer than n iterations, for example, when the matrix M converges before n iterations are reached. For each successive step k, for k=1 . . . n, where n is a number of nodes in the network topology for which matrix M is being calculated, the calculation of matrix M in the first algorithm may be illustrated by the pseudo-code given in Table 3.

TABLE 3

Pseudo-code of a first algorithm for calculating matrix M

```
for k = 1 to n do
    for i = 1 to n do
        for j = 1 to n do
            m_ij = min (m_ij, (m_ik + m_kj))
        end;
    end;
end;
```

As is evident in the pseudo-code in Table 3, for each value of k that is iterated, row k and column k remain unchanged from previous matrix M in the first algorithm. Based on the pseudo-code in Table 3, a first step to calculate a final matrix M according to the first algorithm for k=1 is illustrated in Table 4, based on the starting version of matrix M in Table 3.

TABLE 4

First iteration of matrix M in the first algorithm for k = 1

| NODES | A | B | C | D |
|---|---|---|---|---|
| A | 0 | X | 1 | X |
| B | 1 | 0 | 2 | X |
| C | X | 1 | 0 | 1 |
| D | 1 | X | 2 | 0 |

In Table 4, when k=1, row A and column A remain unchanged from Table 3 in the first iteration of the first algorithm. In Table 4, the element at row B, column C changes to 2, indicating the 2 hops to reach node C from node B in network topology 300 in the first algorithm. In Table 4, the element at row D, column C changes to 2, indicating the 2 hops to reach node C from node D in network topology 300 in the first algorithm.

Based on the pseudo-code in Table 3, a second step to calculate a final matrix M according to the first algorithm for k=2 is illustrated in Table 5, based on the first iteration of matrix M in Table 4.

TABLE 5

Second iteration of matrix M in the first algorithm for k = 2

| NODES | A | B | C | D |
|---|---|---|---|---|
| A | 0 | X | 1 | X |
| B | 1 | 0 | 2 | X |
| C | 2 | 1 | 0 | 1 |
| D | 1 | X | 2 | 0 |

In Table 5, when k=2, row B and column B remain unchanged from Table 4 in the second iteration of the first algorithm. In Table 5, the element at row C, column A changes to 2, indicating the 2 hops to reach node A from node C in network topology 300 in the first algorithm.

Based on the pseudo-code in Table 3, a third step to calculate a final matrix M according to the first algorithm for k=3 is illustrated in Table 6, based on the second iteration of matrix M in Table 5.

TABLE 6

Third iteration of matrix M in the first algorithm for k = 3

| NODES | A | B | C | D |
|---|---|---|---|---|
| A | 0 | 2 | 1 | 2 |
| B | 1 | 0 | 2 | 3 |
| C | 2 | 1 | 0 | 1 |
| D | 1 | 3 | 2 | 0 |

In Table 6, when k=3, row C and column C remain unchanged from Table 5 in the third iteration of the first algorithm. In Table 6, the element at row A, column B changes to 2, indicating the 2 hops to reach node B from node A in network topology 300 in the first algorithm. In Table 6, the element at row A, column D changes to 2, indicating the 2 hops to reach node A from node D in network topology 300 in the first algorithm. In Table 6, the element at row B, column D changes to 3, indicating the 3 hops to reach node D from node B in network topology 300 in the first algorithm. In Table 6, the element at row D, column B changes to 3, indicating the 3 hops to reach node B from node D in network topology 300 in the first algorithm.

Based on the pseudo-code in Table 3, a fourth step to calculate a final matrix M according to the first algorithm for k=4 is illustrated in Table 7, based on the third iteration of matrix M in Table 6.

TABLE 7

Fourth iteration of matrix M in the first algorithm for k = 4

| NODES | A | B | C | D |
|---|---|---|---|---|
| A | 0 | 2 | 1 | 2 |
| B | 1 | 0 | 2 | 3 |
| C | 2 | 1 | 0 | 1 |
| D | 1 | 3 | 2 | 0 |

In Table 7, when k=4, row D and column D remain unchanged from Table 6 in the fourth iteration of the first algorithm. In Table 7, no further changes may occur based on the pseudo-code in Table 3 from Table 6. As shown above in the first algorithm, matrix M holds values that indicate a minimum number of hops, representing individual all optical paths, for each respective pair of nodes in a given network topology. When each non-zero value (or each non-identity value) in matrix M is subtracted by 1, the resulting value may represent a number of regenerators for reaching each of the respective pair of nodes with all optical paths.

Once matrix M has been calculated in the final converged state, matrix M may be used to generate any desired reachability matrix $RM\hat{\ }i$. An algorithm for obtaining a reachability matrix $RM\hat{\ }a$ from matrix M is illustrated as pseudo-code in Table 8A. In Table 8A, element $rm_{ij}$ is an element in reachability matrix $RM\hat{\ }a$, where a is a desired number of hops, while $m_{ij}$ is a corresponding element in matrix M. In the example algorithm of Table 8A, the elements of $RM\hat{\ }a$ are defined to indicate reachability between two nodes in a number of hops or fewer.

TABLE 8A

Pseudo-code of an algorithm for calculating matrix $RM\hat{\ }a$ from matrix M

```
for i = 1 to n do
    for j = 1 to n do
        if (m_ij > a), then rm_ij =0
        if (m_ij ≤ a), then rm_ij =1
    end
end
```

In Table 8B, another alternative algorithm is shown that obtains an $RM\hat{\ }a$ in which the elements are defined to indicate reachability in exactly a number of hops.

TABLE 8B

Pseudo-code of an algorithm for calculating matrix $RM\hat{\ }a$ from matrix M

```
for i = 1 to n do
    for j = 1 to n do
        if (m_ij ≠ a), then rm_ij =0
        if (m_ij = a), then rm_ij j =1
    end
end
```

Thus, once matrix M has been calculated, any reachability matrix RM^a may be generated with relatively small computational resources, including memory consumption, based on the algorithms in Tables 8A or 8B.

A first example calculation of the algorithm in Table 8A for a=1 using matrix M calculated above for network topology 300 in the first algorithm, for example, from Table 6, may be given in Table 9. It is noted that the identity values in Table 9 have become 1 due to the sign convention used in the algorithm in Table 8A.

TABLE 9

Reachability matrix RM^1 calculated from matrix M in Table 6 using pseudo-code in Table 8A

| NODES | A | B | C | D |
|---|---|---|---|---|
| A | 1 | 0 | 1 | 0 |
| B | 1 | 1 | 0 | 0 |
| C | 0 | 1 | 1 | 1 |
| D | 1 | 0 | 0 | 1 |

A second example calculation of the algorithm in Table 8A for a=2 using matrix M calculated above for network topology 300 in the first algorithm, for example, from Table 6, may be given in Table 10. It is noted that the identity values in Table 10 have become 1 due to the sign convention used in the algorithm in Table 8A.

TABLE 10

Reachability matrix RM^2 calculated from matrix M in Table 6 using pseudo-code in Table 8A

| NODES | A | B | C | D |
|---|---|---|---|---|
| A | 1 | 1 | 1 | 1 |
| B | 1 | 1 | 1 | 0 |
| C | 1 | 1 | 1 | 1 |
| D | 1 | 0 | 1 | 1 |

A second algorithm for calculating each successive matrix M(a) beginning with RM^1 in Table 1 for network topology 300 is shown by the pseudo-code in Table 11. In the second algorithm, for each successive value for a, M(a) is multiplied using boolean matrix multiplication by the reachability matrix RM^1.

TABLE 11

Pseudo-code of a second algorithm for calculating matrix M

```
for a = 2 to ( n-1 ) do
  converged = true
  for i = 1 to n do
    for j = 1 to n do
      if ( µ_{ij} = 0 ) ∧ ∃k[ 0<µ_{ik} ∧ µ_{ik}≤a+1 ∧ µ_{kj}=1 ], then µ_{ij} := a+1
      converged = false
    end
  end
  if (converged = true) then break
end
```

In the second algorithm, when convergence of M is detected, the second algorithm may terminate early. The second algorithm may approach $O(N^3)$ as a increases and may be performed in-place by overwriting elements in each successive iteration.

As disclosed, different methods may be used to calculate matrix M.

In a first embodiment of calculating matrix M, each reachability matrix RM^i may be pre-calculated for all i, or until the reachability matrix converges (or does not change upon self-multiplication). Then, the information in all matrices RM^i may be encoded into matrix M. In the first embodiment of calculating matrix M, all individual reachability matrices RM^i may co-exist in memory.

In a second embodiment of calculating matrix M, such as by using the first algorithm or the second algorithm described above, an initial reachability matrix RM^1 may be used as a starting point. Then, in-place calculations may be performed on successive matrices beginning with RM^1 to obtain a final matrix M by computing transitive closure. The final matrix M may include information from all reachability matrices RM^i. In the second embodiment of calculating matrix M, computational speed and memory consumption may be reduced, which may reduce computational resources used.

Figure 4:
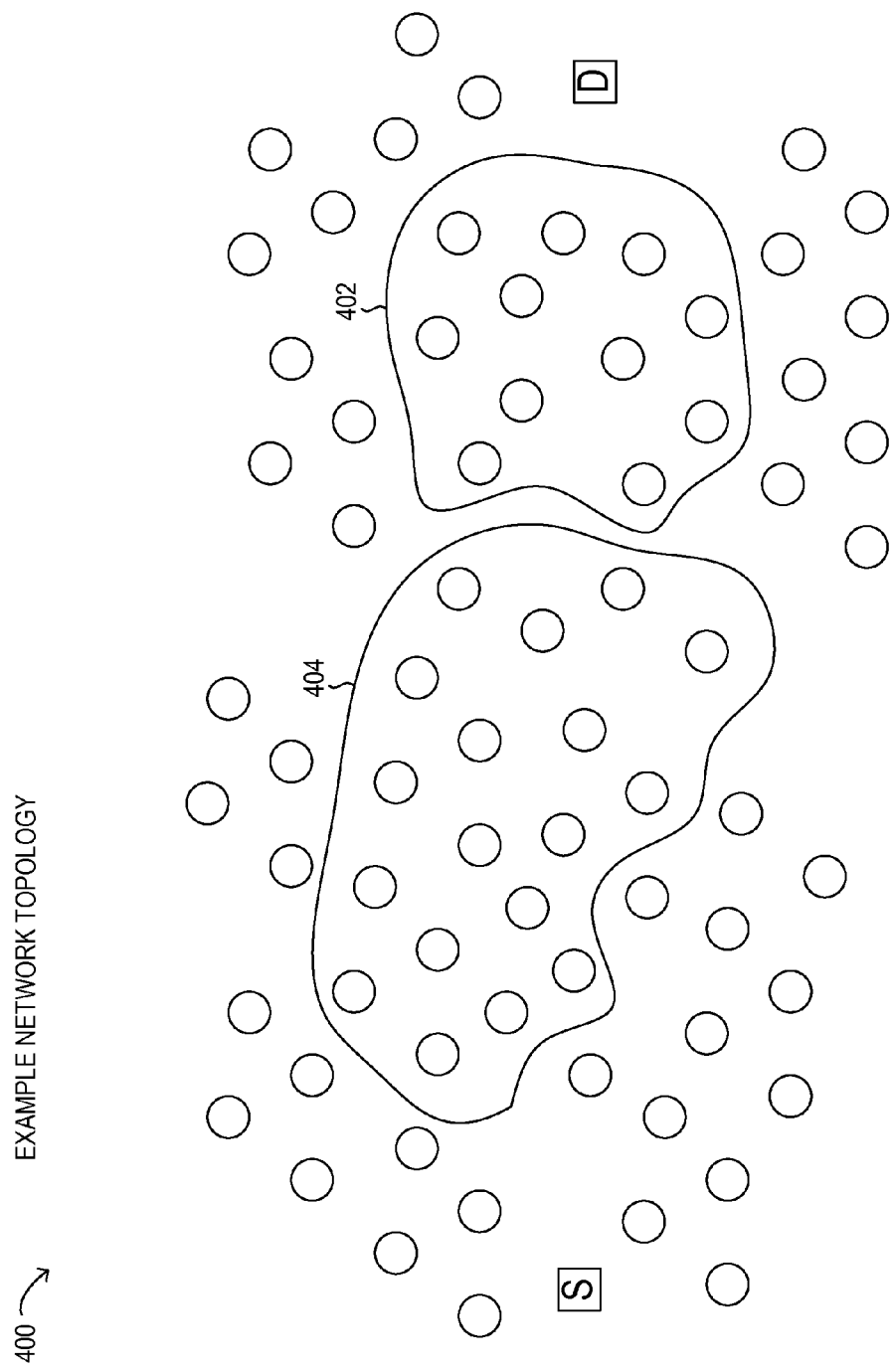
FIG. 4 is a block diagram of selected elements of an embodiment of a network topology.

Referring now to FIG. 4, a block diagram of selected elements of an embodiment of network topology 400 for illustrating an example embodiment of memory-efficient matrix-based optical path computation, as disclosed herein, is illustrated. As shown, network topology 400 includes source node S and destination node D, as well as a plurality of other network nodes shown as circles. The locations of the network nodes in network topology 400 may indicate a relative location of the network nodes, although network topology may not be drawn to scale. As described above for network topology 300, a matrix M may be calculated for network topology 400, based on a physical network topology of optical paths among the nodes in network topology 400, which have been omitted in FIG. 4 for descriptive clarity. The matrix M may enable determination of a number of regenerators to be used for connecting any arbitrary pair of nodes in network topology 400. Accordingly, matrix M may also be used to find potential regenerator locations for a desired optical path between source node S and destination node D in network topology 400.

Initially, matrix M may be used to generate reachability matrices RM^1 and RM^2 for network topology 400, as described above with respect to FIG. 3. Then, first set 402 of the nodes in network topology 400 may be identified from reachability matrices RM^1 and RM^2, obtained from matrix M, where first set 402 includes nodes that are reachable in 1 hop from destination node D and in 2 hops from source node S. Then, second set 404 of the nodes in network topology 400 may be identified from reachability matrices RM^1 and RM^2, obtained from matrix M, where second set 404 includes nodes that are reachable in 1 hop from first set 402 and in 1 hop from source node S.

After first set 402 and second set 404 have been identified, end-to-end connections between source node S and destination node D may be identified using second set 404 and first set 402. Second set 404 may represent potential first hop locations from source node S, while first set 402 may represent potential first hop locations from destination node D. Then, first hop locations from second set 404 to first set 402 may be identified. In this manner, potential end-to-end connections between source node S and destination node D may be identified. The potential end-to-end connections may represent various possible connections between source node S and destination node D that may be evaluated using various criteria to select a desired connection. It is noted that a number of iterations of the procedure to select sets of nodes may be bounded by a value in matrix M for the pair of source node S and destination node D.

Figure 5:
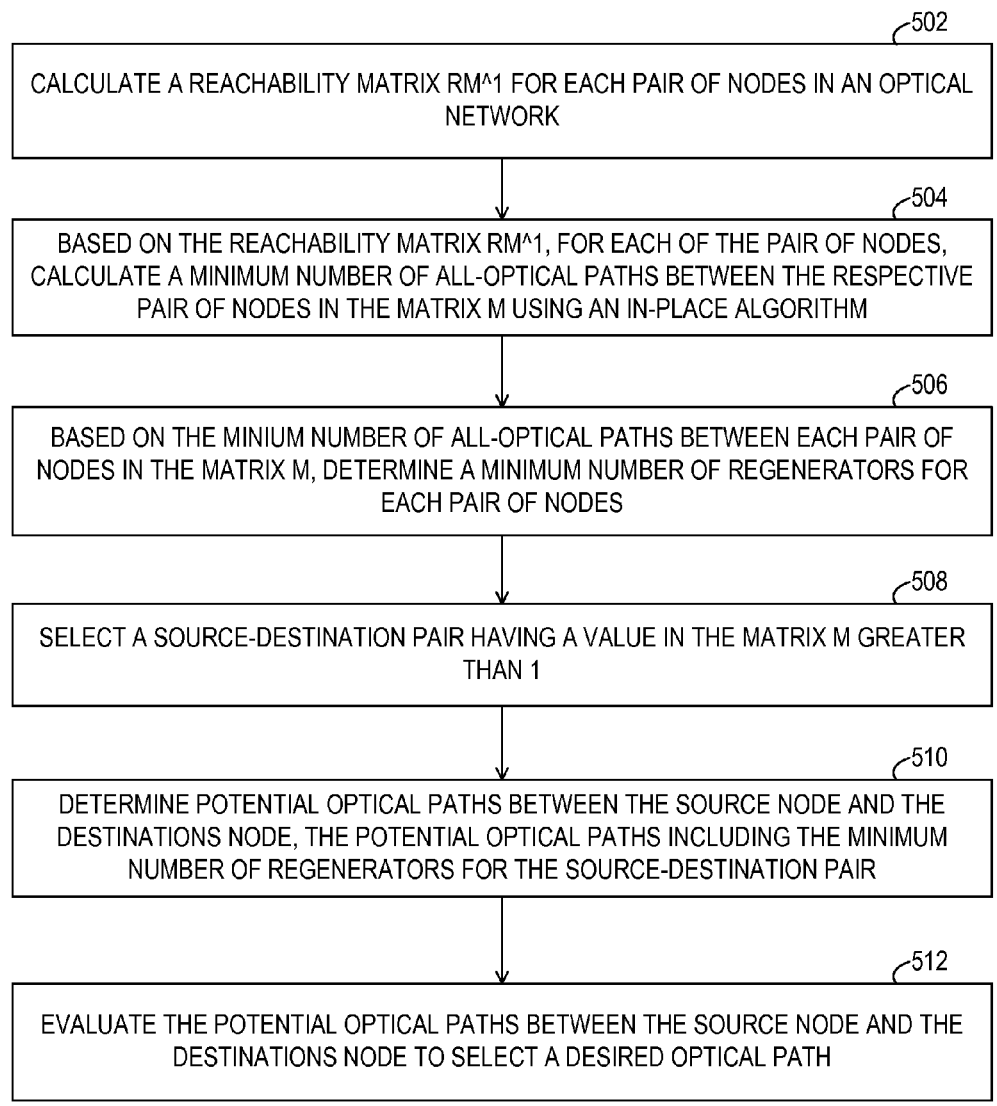
FIG. 5 is a flow chart of selected elements of an embodiment of a method for memory-efficient matrix-based optical path computation.

Referring now to FIG. 5, a flow chart of selected elements of an embodiment of method 500 for memory-efficient matrix-based optical path computation is illustrated. Method 500 may be implemented for optical path computation using a matrix M by path computation engine 202, in exemplary embodiments, as disclosed herein. It is noted that certain operations described in method 500 may be optional or may be rearranged in different embodiments.

Method 500 may begin by calculating (operation 502) a reachability matrix RM^1 for each pair of nodes in an optical network. Based on the reachability matrix RM^1, for each of the pair of nodes, calculating (operation 504) a minimum number of all optical paths between the respective pair of nodes in the matrix M using an in-place algorithm. Operation 504 may include applying a transitive closure algorithm to perform an iterative in-place calculation on successive iterations of the matrix M, while the iterative in-place calculation may be performed for a maximum number of iterations corresponding to a number of the nodes in the optical network. Operation 504 may be performed using the first algorithm or the second algorithm described above with respect to FIG. 3. Based on the minimum number of all-optical paths between each pair of nodes in the matrix M, a minimum number of regenerators for each pair of nodes may be determined (operation 506). The minimum number of regenerators for each pair of nodes determined in operation 506 may be a respective value in matrix M minus 1 for non-zero values in matrix M. A source-destination pair may be selected (operation 508) having a value in the matrix M greater than 1. Potential optical paths between the source node and the destination node may be determined (operation 510), the potential optical paths including the minimum number of regenerators for the source-destination pair. The potential optical paths between the source node and the destination node may be evaluated (operation 512) to select a desired optical path.

Figure 6:
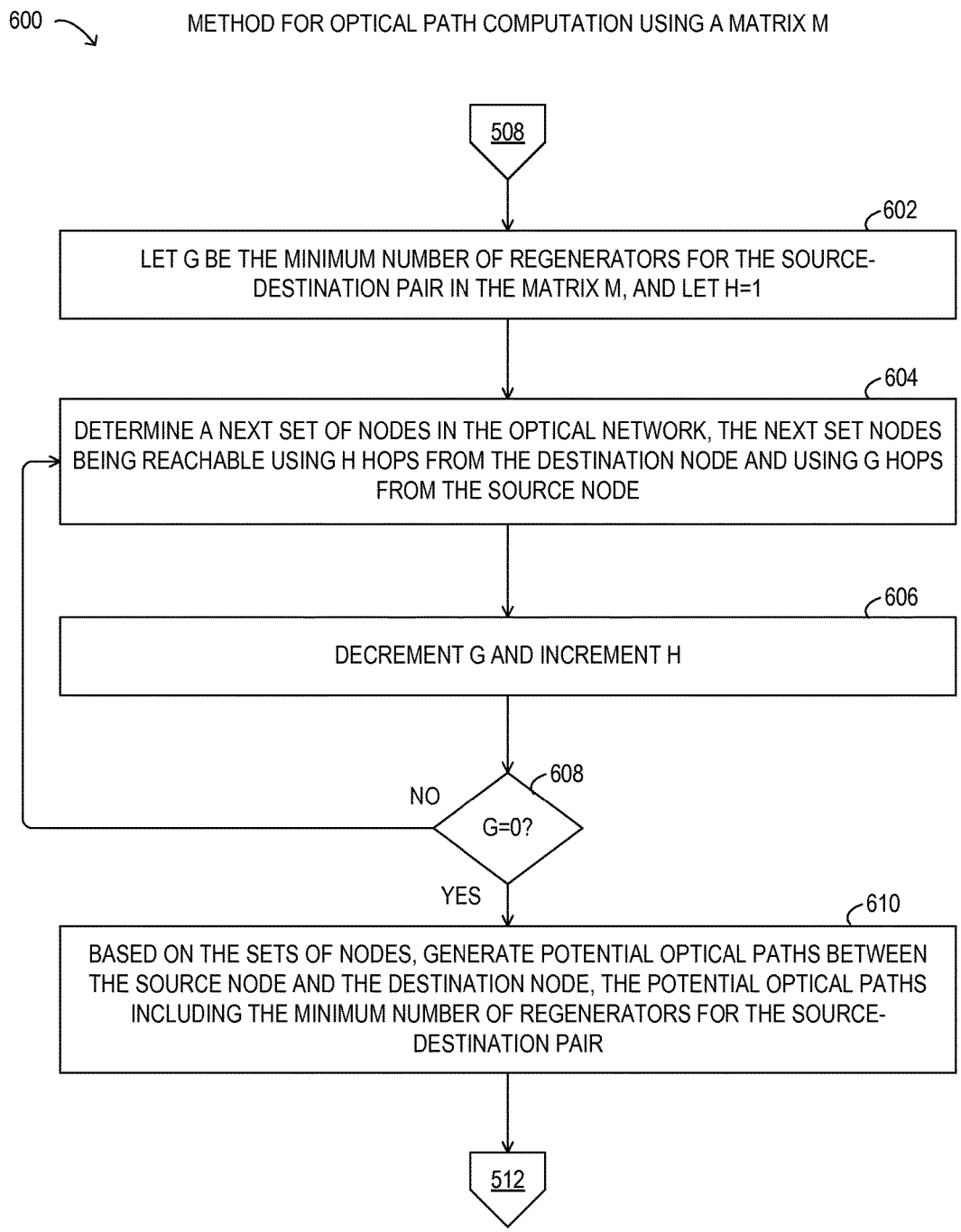
FIG. 6 is a flow chart of selected elements of an embodiment of a method for memory-efficient matrix-based optical path computation.

Referring now to FIG. 6, a flow chart of selected elements of an embodiment of method 600 for memory-efficient matrix-based optical path computation is illustrated. Method 600 may be implemented for optical path computation using a matrix M by path computation engine 202, in exemplary embodiments, as disclosed herein. Method 600 may represent an embodiment of operation 510 in method 500 of FIG. 5. It is noted that certain operations described in method 600 may be optional or may be rearranged in different embodiments.

Method 600 may begin after operation 508 in method 500 by letting (operation 602) G be the minimum number of regenerators for the source-destination pair in the matrix M, and letting (operation 602) H=1. Method 600 may then perform an iterative procedure in operations 604, 606, and 608, in which reference to a "next set of nodes" is used to designate an iterative instance of a set of nodes in the iterative procedure. A next set of nodes in the optical network may be determined (operation 604), the next set of nodes being reachable using H hops from the destination node and using G hops from the source node. Then, G may be decremented (operation 606) and H may be incremented (operation 608). Next, a decision may be made whether G=0 (operation 608). When G≠0, the result of operation 608 is NO, and method 600 may loop back to operation 604. When the G=0, the result of operation 608 is YES, and, based on the sets of nodes, potential optical paths may be between the source node and the destination node may be generate (operation 610), the potential optical paths including the minimum number of regenerators for the source-destination pair. After operation 610, method 600 may proceed to operation 512 in method 500.

As disclosed above, when performing optical path computation based on matrix operations using reachability matrices, an amount of memory consumed, for example by path computation engine 202, to evaluate a desirability or economic feasibility of optical paths may be a constraining factor in performing such computations. The optical paths may be evaluated to determine best solutions for regenerator locations, as described above with respect to FIG. 4. Accordingly, the methods disclosed above for in-place calculation of matrix M may enable computational tractability for performing optical path computations, even for large networks having N-number of nodes, where N is relatively large, such as in the thousands of nodes. As described above with respect to FIGS. 3-6, potential optical paths may be identified, along with potential regenerator locations, such as identified with first set 402 and second set 404 in FIG. 4, which may represent a hierarchical organization of regenerator stages.

As will now be described in further detail, based on the identified potential optical paths and regenerator stages, a hierarchical guided search may be performed to select certain optical paths from the potential optical paths. The hierarchical guided search may utilize a hierarchical guided search (HGS) graph that includes the identified regenerator stages between a source node and a destination node, along with optical path groups (OPG) that connect the nodes. As will be described, the hierarchical guided search may utilize potential regenerator location information, as well as minimum cost information for optical paths between nodes.

An optical path group may collectively represent one or more all-optical paths (OP) in a single direction between a given pair of nodes. Accordingly, every matrix element in matrix M may represent a single optical path group. In case a matrix element of M equals zero, a corresponding optical path group represents an empty set of optical paths. Optical paths may each comprise various sequences of physical optical links, and optical nodes. A specific route followed by an optical path through the network may differ. In some applications, where network protection using a level of redundancy is desired, pairs of optical paths (or more generally, n-multiples of optical paths or end-to-end connections) featuring some level of disjointness may be used. As used herein, 'disjointness' refers to having exclusive access to (or not sharing) certain optical resources in the network. For example within an optical path group, node-disjoint optical paths may pass through only different optical nodes (or may not pass through any shared nodes), except for source and destination nodes. Link-disjoint optical paths may pass through only different optical links (or may not pass through any shared optical links). Certain disjoint optical paths may be defined as both node-disjoint and link-disjoint.

For two end-to-end connections to be node-disjoint, a primary feature of interest in path computation may include the end-to-end connections not sharing any regenerator nodes, even though the source and destination nodes of the end-to-end connections may be shared. A secondary feature of interest in path computation may be that each of the optical paths included in the end-to-end connections are also node-disjoint. For two end-to-end connections to be link-disjoint, the optical path sets in each connection are mutually link-disjoint.

Although optical path groups with different source or destination nodes are more likely to be node-disjoint or link-disjoint, disjointness may not be assured with different source or destination nodes. Hence, regenerator-node-disjointness of end-to-end connections may be a required, but not sufficient condition for end-to-end connections that are node-disjoint or link-disjoint. It is noted that, in various embodiments, other kinds of disjointness may be defined and used as a constraint in optical path computation, such as links that do not share a common conduit.

The hierarchical guided search may then proceed using a hierarchical guided search (HGS) state tree. The HGS state tree may enable hierarchical selection, in that, after potential regenerator nodes have been identified, optical path groups including a plurality of optical paths having the same source and destination nodes may be evaluated and selected based on minimum cost information. Once the optical path groups have been selected for each disjoint path, an optical path from within each optical path group may be selected. During this process, elimination of potential solutions may further enhance computational tractability by reducing the search space early in the search process. For example, as soon as certain optical paths or optical path groups are discovered to not be disjoint, such potential choices may be eliminated from the solution space. In certain embodiments, an A* algorithm may be used for searching or evaluating the possible optical paths.

As described above, disjointness may represent one example of a policy constraint used in the selection of certain optical paths from potential or available optical paths. Latency, distance, and power consumption of a connection are examples of economic constraints, also referred to as cost metrics. Economic constraints may be evaluated and minimized and enforced during the search using a cost function. Policy constraints may be enforced by elimination of certain potential solutions.

Figure 7B:
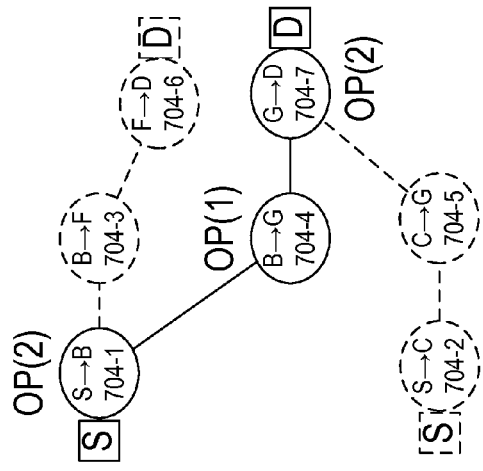
FIG. 7B is a network diagram of selected elements of an embodiment of a hierarchical guided search state tree.
Figure 7A:
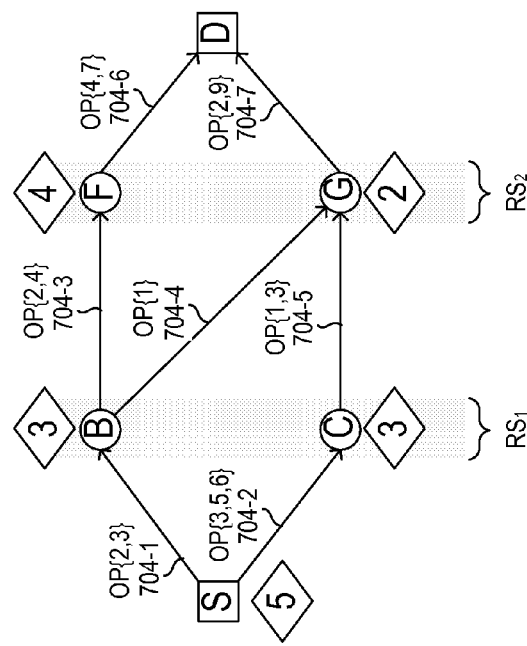
FIG. 7A is a network diagram of selected elements of an embodiment of a hierarchical guided search graph.

Referring now to FIG. 7A, selected elements of an embodiment of HGS graph 700 are illustrated. In certain embodiments, HGS graph 700 may represent an embodiment of network topology 400 shown in FIG. 4. It is noted that HGS graph 700 is an example embodiment shown for descriptive purposes and that other embodiments of HGS graphs may include fewer or more elements and information.

In FIG. 7A, HGS graph 700 shows optical path groups 704 between a source node S and a destination node D. The optical path groups 704 are hierarchically arranged with respect to regenerator stage 1 ($RS_1$) including intermediate nodes B and C, and regenerator stage 2 ($RS_2$) including intermediate nodes F and G. For example, $RS_1$ may correspond to second set 404 in FIG. 4 while $RS_2$ may correspond to first set 402. Each optical path group 704 in HGS graph 700 is annotated with optical path information indicating a number of optical paths and a cost metric for each optical path. As used herein, the cost metric may be indicative of an economic constraint, such as latency, distance, hardware cost, power consumption, excess bandwidth beyond desired minimum bandwidth, excess optical penalty tolerance, or different combinations thereof. The cost metric is used herein as an integer metric for relative cost between optical paths for descriptive clarity. It is noted that in different embodiments, more precise cost metrics, such as real numbers indicating an actual monetary cost, may be used. Specifically, optical path group 704-1 includes two all-optical paths between source node S and node B having respective cost metrics of 2 and 3; optical path group 704-2 includes three all-optical paths between source node S and node C having respective cost metrics of 3, 5, and 6; optical path group 704-3 includes two all-optical paths between node B and node F having respective cost metrics of 2 and 4; optical path group 704-4 includes one all-optical path between node B and node G having a respective cost metrics of 1; optical path group 704-6 includes two all-optical paths between node F and destination node D having respective cost metrics of 4 and 7; and optical path group 704-7 includes two all-optical paths between node G and destination node D having respective cost metrics of 2 and 9. Based on the cost metric information in HGS graph 700, the minimum cost metric from each node to destination node D is given in Table 12 and is shown in a diamond next to each respective node in FIG. 7A, where the destination node D itself has been omitted.

TABLE 12

Minimum cost metric to destination node D in HGS graph 700

| NODES | Min. Cost Metric |
|---|---|
| S | 5 |
| B | 3 |
| C | 3 |
| F | 4 |
| G | 2 |

Referring now to FIG. 7B, selected elements of an embodiment of HGS state tree 701 are illustrated. In given embodiments, HGS state tree 701 may be based on HGS graph 700 shown in FIG. 7A. It is noted that HGS state tree 701 is an example embodiment shown for descriptive purposes and that other embodiments of HGS state trees may include fewer or more elements and information.

In HGS state tree 701, a hierarchical search and decision process for determining a lowest cost optical path from source node S to destination node D, based on HGS graph 700. Thus, leaves in HGS state tree 701 represent optical path groups 704, while lines in HGS state tree 701 represent selections of successive optical path groups 704, with solid lines indicating selected optical path groups and dashed lines indicating optical path groups that have not been selected.

In HGS state tree 701, beginning with source node S, a first decision may be made to select optical path group 704-1 to node B or optical path group 704-2 to node C based on the cost metric information available. The remaining cost metric (see also Table 12) from both nodes B and C is 3 and the overall lowest cost estimate to destination node D from source node S is 5. Thus, from source node S a first decision may be made to select the lowest cost all-optical path to $RS_1$. As is evident from HGS graph 700, optical path group 704-1 includes optical paths with cost metric 2 and 3, while optical path group 704-2 includes optical paths with cost metrics 3, 5, and 6. Thus, OP(2) from optical path group 704-1 is selected in the first decision to $RS_1$. As a result of the first decision, optical path group 704-2 is not selected and optical path group 704-5 is also eliminated at the first decision.

Then, from optical path group 704-1 OP(2), a second decision may be made in HGS state tree 701 from node B to select among optical path group 704-3 to node F or to select optical path group 704-4 to node G. The remaining cost metric from nodes F is 4 and from node G is 2, which favors node G. Furthermore, the lowest cost optical path in RS2 is OP(1) in optical path group 704-4, which also favors node G. Thus, from node B a second decision may be made to select the lowest cost all-optical path to $RS_2$ and OP(1) from optical path group 704-4 is selected in the first decision to $RS_1$. As a result of the second decision, optical path group 704-3 is not selected and optical path group 704-6 is also eliminated at the second decision.

Finally, a third decision is made to select optical path group 704-7 from node G to destination node D, in which OP(2) is selected as the lowest cost all-optical path. Accordingly, from node B a second decision may be made to select the lowest cost all-optical path to $RS_2$ and OP(1) from optical path group 704-4 is selected in the third decision to $RS_2$. The third decision also results in the overall cost metric of 5 from source node S to destination node D, which confirms that the lowest cost metric optical path has been selected.

The above procedure for decision-making using HGS state tree 701 has been presented for descriptive clarity to show how the information in HGS graph 700 may be utilized to obtain a single lowest cost metric optical path, which does not introduce any issues of disjointness among optical paths. When additional optical paths between source node S and destination node D are desired, the procedure described above may be repeated to obtain additional optical paths with omission of previously selected optical paths and previously selected regenerator nodes. It is noted that elimination of nodes may be temporary, for example, for a given iteration of processing information in HGS graph 700, and that previously eliminated nodes may be reconsidered upon subsequent attempts.

However, when using HGS state tree 701, considerations of disjoint optical paths may also be introduced when selecting optical paths or optical path groups. As noted above, optical paths in different optical path groups may not be completely disjoint, due to physical network topology. In particular, when selecting multiple optical paths, such as N-tuple disjoint optical paths between source node S and destination node D, the pruning of OPG leaves in HGS state tree 701 may be an effective mechanism for improving efficiency of the hierarchical guided search, as compared to a conventional approach where disjointness is evaluated after complete optical paths have been selected. N-tuple disjoint optical paths may be desired in real-life provisioning of optical networks for various implementations. For example, when a high degree of network availability or reliability is desired, a working path and a protection path that are 2-tuple disjoint may be desired.

In HGS state tree 701, disjointness may be considered when selecting among successive optical paths at each leaf and based on the remaining cost metric to the destination node. In this manner, the evaluation of disjointness is also made more efficient due to a limited number of optical paths that are considered at a given time. When two optical paths are found to be non-disjoint, then a selection based on a cost metric may be made among remaining optical paths that are potentially disjoint. In certain embodiments, additional criteria, such as a maximum degree of disjointness, for example, may also be applied to the procedure using HGS search tree 701. In this manner, the hierarchical guided search using HGS graph 700 and HGS state tree 701 may obtain a lowest cost optical path for a desired degree of disjointness for N-tuple disjoint optical paths.

Figure 8:
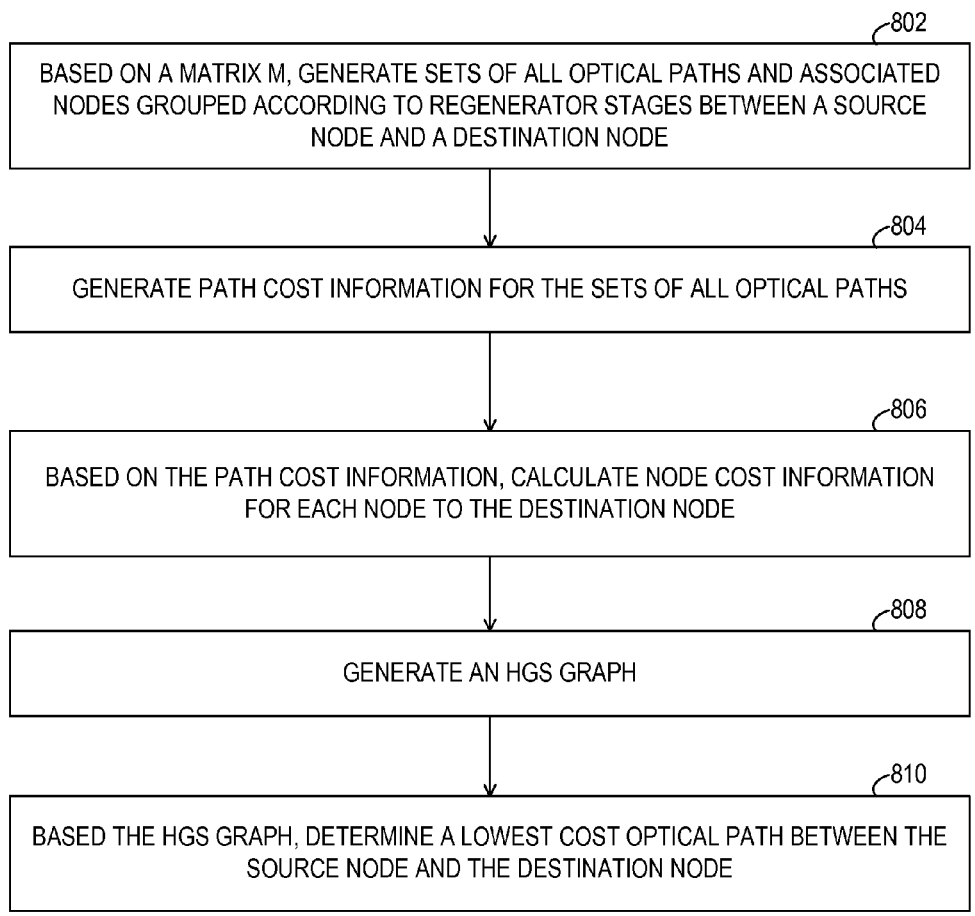
FIG. 8 is a flow chart of selected elements of an embodiment of a method for optical path evaluation using a hierarchical guided search.

Referring now to FIG. 8, a flow chart of selected elements of an embodiment of method 800 for optical path evaluation using a hierarchical guided search is illustrated. Method 800 may be implemented for optical path evaluation by path computation engine 202, in exemplary embodiments, as disclosed herein. In certain embodiments, method 800 may be one embodiment of operation 512 in method 500 (see FIG. 5). Method 800 may be performed using HGS graph 700 (see FIG. 7) in various embodiments. It is noted that certain operations described in method 800 may be optional or may be rearranged in different embodiments.

Method 800 may begin by, based on a matrix M, generating (operation 802) sets of all-optical paths and associated nodes grouped according to regenerator stages between a source node and a destination node. Then, path cost information may be generated (operation 804) for the sets of all-optical paths. The path cost information may be a cost metric for each optical path. Based on the path cost information, node cost information may be calculated (operation 806) for each node to the destination node. The node cost information may include a minimum cost metric for each node to the destination node. Then, an HGS graph may be generated (operation 808). The HGS graph may include the nodes associated with the sets of all-optical paths, optical path groups comprising optical paths between common nodes, the path cost information, and the node cost information. In certain cases, the optical paths may be N-tuple disjoint. Based on the HGS graph, a lowest cost optical path may be determined (operation 810) between the source node and the destination node. An HGS state tree may be used to select the lowest cost optical path in a process that prunes unselected nodes and optical paths from consideration early in the process to minimize a search space of the process. A plurality of lowest cost optical paths may be determined. At least some of the plurality of lowest cost optical paths may be disjoint optical paths.

As disclosed herein, a matrix M indicating a minimum number of all-optical paths between pairs of nodes may be generated in one embodiment using an algorithm for transitive closure. In various embodiments, different algorithms and methods may be used to generate matrix M. Once a convergent matrix M has been generated that attains transitive closure, any corresponding reachability matrix $RM^a$ for any value of a may be obtained from matrix M in a computationally efficient manner. Matrix M may be used to determine groups of potential regenerator placements and obtain end-to-end optical paths by selecting desired sequences of regenerators.

As disclosed herein, a matrix M is used to determine groups of potential regenerator placements and obtain potential end-to-end optical paths by selecting desired sequences of regenerators. Then, a hierarchical guided search may be employed to efficiently select desired N-tuple disjoint optical paths from the potential optical paths. The hierarchical guided search may employ a search graph and a search tree to guide the search and to eliminate candidate nodes and optical paths early in the search process.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for evaluation of optical paths in optical networks, the method comprising:

based on a matrix M including optical reachability information for nodes in an optical network, generating sets of optical paths between a source node and a destination node, and wherein the optical paths include a minimum number of regenerators between the source node and the destination node;

generating path cost information for the sets of optical paths, wherein the path cost information includes cost metric information for the sets of optical paths;

based on the path cost information, calculating node cost information for each node associated with the optical paths to the destination node;

generating a hierarchical guided search graph including the nodes associated with the sets of optical paths, optical path groups comprising optical paths between common nodes, the path cost information, and the node cost information;

based on the hierarchical guided search graph, determining a lowest cost optical path between the source node and the destination node; and transmitting, to nodes that comprise the lowest cost optical path, communication via a signaling protocol to establish a network service along the lowest cost optical path.

2. The method of claim 1, wherein the cost metric information is indicative of at least one property of an optical path selected from: latency, distance, hardware cost, power consumption, excess bandwidth, and excess optical penalty tolerance.

3. The method of claim 1, wherein determining the lowest cost optical path between the source node and the destination node further comprises:

beginning with the source node in the hierarchical guided search graph, evaluating optical path groups from each node to each successive regenerator stage towards the destination node in the hierarchical guided search graph based on the path cost information and the node cost information, including selecting a next optical path to a next regenerator stage.

4. The method of claim 3, further comprising:
eliminating from further consideration unselected optical path groups that are not selected from each node, including eliminating from further consideration unselected nodes dependent on the unselected optical path groups.

5. The method of claim 3, further comprising:
evaluating the optical path groups based on the path cost information, the node cost information, and disjointness among selected optical paths; and
selecting the next optical path to be disjoint from previously selected optical paths.

6. The method of claim 3, further comprising:
determining a plurality of lowest cost optical paths between the source node and the destination node, including the lowest cost optical path.

7. The method of claim 6, wherein the plurality of lowest cost optical paths are disjoint paths.

8. A control system for evaluation of optical paths in optical networks, the control system comprising instructions executable by a processor having access to memory media storing the instructions, the instructions enabling the processor to:

based on a matrix M including optical reachability information for nodes in an optical network, generate sets of optical paths between a source node and a destination node, and wherein the optical paths include a minimum number of regenerators between the source node and the destination node;

generate path cost information for the sets of optical paths, wherein the path cost information includes cost metric information for the sets of optical paths;

based on the path cost information, calculate node cost information for each node associated with the optical paths to the destination node;

generate a hierarchical guided search graph including the nodes associated with the sets of optical paths, optical path groups comprising optical paths between common nodes, the path cost information, and the node cost information;

based on the hierarchical guided search graph, determine a lowest cost optical path between the source node and the destination node; and transmit, to nodes that comprise the lowest cost optical path, communication via a signaling protocol to establish a network service along the lowest cost optical path.

9. The control system of claim 8, wherein the cost metric information is indicative of at least one property of an optical path selected from: latency, distance, hardware cost, power consumption, excess bandwidth, and excess optical penalty tolerance.

10. The control system of claim 8, wherein the instructions to determine the lowest cost optical path between the source node and the destination node further comprise instructions to:

beginning with the source node in the hierarchical guided search graph, evaluate optical path groups from each node to each successive regenerator stage towards the destination node in the hierarchical guided search graph based on the path cost information and the node cost information, including instructions to select a next optical path to a next regenerator stage.

11. The control system of claim 10, further comprising instructions to:
eliminate from further consideration unselected optical path groups that are not selected from each node, including eliminating from further consideration unselected nodes dependent on the unselected optical path groups.

12. The control system of claim 10, further comprising instructions to:
evaluate the optical path groups based on the path cost information, the node cost information, and disjointness among selected optical paths; and
select the next optical path to be disjoint from previously selected optical paths.

13. The control system of claim 10, further comprising instructions to:
determine a plurality of lowest cost optical paths between the source node and the destination node, including the lowest cost optical path.

14. The control system of claim 13, wherein the plurality of lowest cost optical paths are disjoint paths.

15. An optical network comprising a control system for evaluation of optical paths in optical networks, the control system comprising instructions executable by a processor having access to memory media storing the instructions, the instructions enabling the processor to:

based on a matrix M including optical reachability information for nodes in an optical network, generate sets of optical paths between a source node and a destination node, and wherein the optical paths include a minimum number of regenerators between the source node and the destination node;

generate path cost information for the sets of optical paths, wherein the path cost information includes cost metric information for the sets of optical paths;

based on the path cost information, calculate node cost information for each node in the optical network to the destination node;

generate a hierarchical guided search graph including the nodes associated with the sets of optical paths, optical path groups comprising optical paths between common nodes, the path cost information, and the node cost information;

based on the hierarchical guided search graph, determine a lowest cost optical path between the source node and the destination node; and transmit, to nodes that comprise the lowest cost optical path, communication via a signaling protocol to establish a network service along the lowest cost optical path.

16. The optical network of claim 15, wherein the instructions to determine the lowest cost optical path between the source node and the destination node further comprise instructions to:

beginning with the source node in the hierarchical guided search graph, evaluate optical path groups from each node to each successive regenerator stage towards the destination node in the hierarchical guided search graph based on the path cost information and the node cost information, including instructions to select a next optical path to a next regenerator stage.

17. The optical network of claim 16, further comprising instructions to:

eliminate from further consideration unselected optical path groups that are not selected from each node, including eliminating from further consideration unselected nodes dependent on the unselected optical path groups.

18. The optical network of claim 16, further comprising instructions to:

evaluate the optical path groups based on the path cost information, the node cost information, and disjointness among selected optical paths; and select the next optical path to be disjoint from previously selected optical paths.

19. The optical network of claim 16, further comprising instructions to:

determine a plurality of lowest cost optical paths between the source node and the destination node, including the lowest cost optical path.

20. The optical network of claim 19, wherein the plurality of lowest cost optical paths are disjoint paths.

21. The optical network of claim 15, wherein the cost metric information is indicative of at least one property of an optical path selected from: latency, distance, hardware cost, power consumption, excess bandwidth, and excess optical penalty tolerance.

* * * * *